United States Patent Office 3,610,110
Patented Oct. 5, 1971

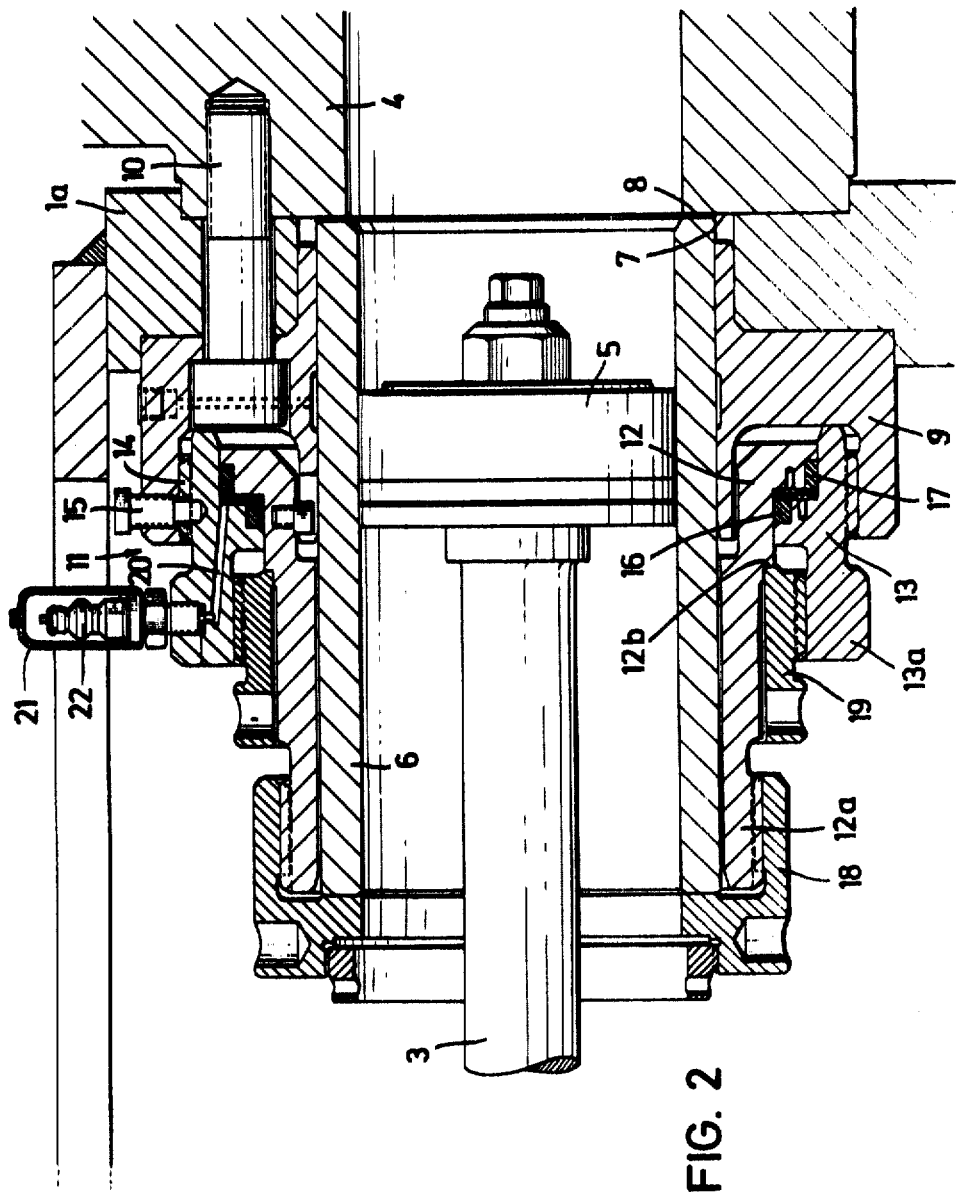

3,610,110
PISTON PUMP FOR LIQUIDS
Martin Schaaf, Erkelenz, Rhineland, Germany, assignor to Maschinen- und Bohrgerate-Fabrik Alfred Wirth & Co. KG, Erkelenz, Rhineland, Germany
Filed Mar. 31, 1970, Ser. No. 24,297
Claims priority, application Germany, Apr. 5, 1969, P 19 17 694.4
Int. Cl. F16j 11/04
U.S. Cl. 92—169
10 Claims

ABSTRACT OF THE DISCLOSURE

A piston pump for liquids, in particular a high pressure pump, with means for clamping the cylinder liner or cylinder liners against a supporting face, the cylinder liner being surrounded by a pressure medium actuated clamping device and there is provided at least one mechanical means for maintaining the clamping force after the pressure medium has been released.

---

Figure 1:
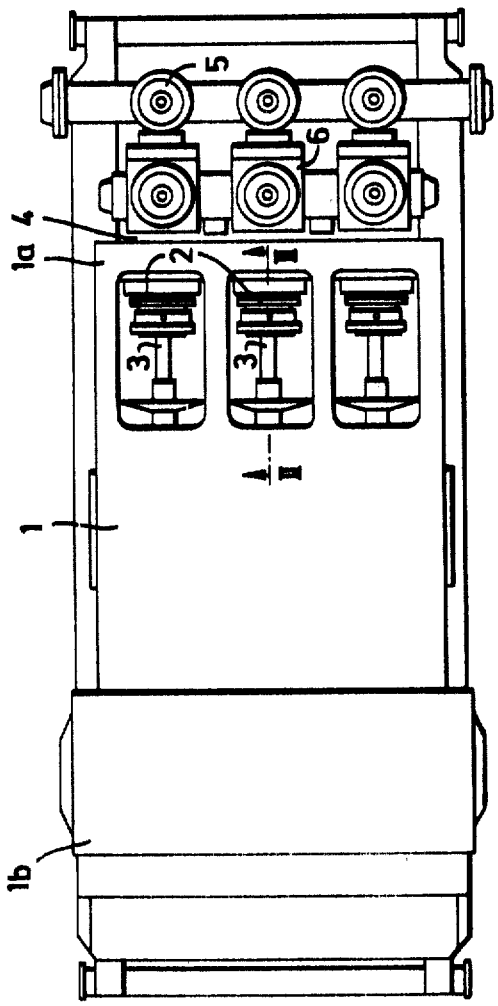

The invention relates to a piston pump for liquids, in particular a high-pressure pump, with means for clamping the cylinder liner or cylinder liners against a supporting face.

Pumps of this type usually have a pump casing or a pump frame and a part called the pump body. There are various other parts mounted in or on the pump casing, such as the cylinder assemblies and the parts driving the piston rods with the piston, usually a crank drive with connecting rods and crossheads. The pump body mounted in the pump casing contains bores or ducts for the liquid and the valves.

The pistons of pumps of this type run in cylinder liners resting each with one end on a fixed support, a surface of the pump body. This point must be perfectly liquid tight. For this reason the cylinder liner is clamped against the supporting face. In known arrangements this is done by means of individual fixing screws and/or a mechanical clamping part tightened by means of screws or bolts.

It has been found that this method of fixing the cylinder liner has a number of disadvantages and in many cases cannot satisfactorily meet the requirements of practical operation. The use of individual screws or bolts makes it difficult to achieve a uniform clamping force over the entire circumference of the cylinder liner. Also, it is not possible to maintain a given force, in particular because of the different effects of friction in the individual threads, which cannot be controlled. Moreover, the mounting and dismantling of a cylinder liner fixed in this way is a comparatively intricate matter because several bolts or screws have to be undone and subsequently retightened. To this must be added the fact that the space available at the various places in question is very confined. This makes difficulties when accommodating the fixing and the clamping parts for the cylinder liner and also limits the accessibility of these parts and their operation. This is particularly inconvenient if the cylinder liners have to be changed quite often, as in the case of pumps used for conveying very abrasive media.

The object of the invention is to overcome the existing disadvantages and inadequacies and to construct a pump of the type referred to in the introduction in such a way that each cylinder liner can be simply, quickly and uniformly clamped with the required force. The construction is also to be arranged so that it meets special requirements as regards safety, ease of operation, easy assembly, and requires little space.

For this purpose, the invention provides for the cylinder liner to be surrounded by a clamping unit actuated by means of a medium under pressure. The clamping unit comprises an annular cylinder connected to a fixed part of the pump, an annular piston accommodated in the annular cylinder, and a force transmission between the annular piston and the cylinder liner, also at least one mechanical part for maintaining the clamping force after the pressure medium has been released.

This arrangement enables the cylinder liner to be clamped along its entire surface with a uniform and accurately specified force against the supporting face, so that it is held securely and leakage is entirely prevented. The admission of the pressure medium and the application of the pressure can be effected from an existing source or in a very simple manner by means of a hand pump. The hand pump may be equipped with a pressure intensifier. The pressure and thus the clamping force can be read accurately on a pressure gauge. This enables also personnel without specific training to fix a cylinder liner in the proper manner.

The transmission of force between the annular piston and the cylinder liner can be effected in different ways, detachable parts being particularly suitable for this purpose. These parts ensure in their working position the transmission of forces between the parts mentioned above, and in their detached position they enable the cylinder liner to be taken out without difficulty. The detachable parts could be in particular in the form of an insert, yoke, or the like, engaging in facing recesses of the cylinder liner and annular piston, or pivoted catches or the like could be provided, hinged on one of the two parts, and engaging, for instance, with projections or a raised edge on the other part.

An advantageous construction consists also in the annular piston being equipped with a sleeve threaded at its free end, so that a shrouded nut or the like can be screwed on this thread so as to rest against the end of the liner. This yields a design particularly convenient as regards accessibility and handling.

In order to maintain the clamping force applied by the action of the pressure medium, parts for instance, in the shape of wedges, or other suitable parts can be used. A particularly compact, simple, and easily operatable construction is achieved by using a holding ring or the like capable of being screwed on the annular cylinder of the clamping device and engaging with a shoulder, raised edge, projection or the like of the annular piston.

The construction can be advantageously also arranged so that the annular cylinder is detachably connected to a carrier ring surrounding the cylinder liner and fixed to the pump casing. This is particularly convenient from the point of view of production and assembly. The carrier ring can be used especially for centering and guiding the cylinder liner. The connection between the annular cylinder and the carrier ring could be conveniently of the screwed type. This connection can be additionally secured or locked by means of a suitable part.

The carrier ring and the pump body can be fixed by means common to them to the pump casing.

The invention is applicable to pumps of many different types. It is particularly intended for high-pressure pumps and pumps for conveying abrasive and/or aggressive substances, such as mixtures of sand and water, clay sludge, flushing liquid for drilled holes, etc. It may be necessary to change the cylinder liners quite often, an operation required to be done quickly and in a simple manner, and it must be possible to ensure that the newly inserted cylinder liners are adequately clamped. All this is achieved by the invention in a particularly convenient manner.

The invention will now be explained in more detail with reference to the appended drawings in conjunction with the following description, showing further details and features of the invention. In the drawings, FIG. 1 shows a plan view of the pump according to the invention, and FIG. 2 a vertical section through a cylinder arrangement along the trace II—II of FIG. 1.

The pump shown here is a single-acting triple pump designed, for instance, for a working pressure of 300 kg./cm.²-g. and suitable for use as a flushing pump for drilling rigs. The entire pump casing is denoted by the number 1 and comprises the cylinder assemblies 2, and their piston rods 3, moved by a crank drive in the rear part 1b of the pump casing through connecting rods and crossheads. At the front end of the pump casing 1 there is a pump body 4 containing the inlet and delivery valves 5 and 6 and the appropriate ducts for the liquid.

As shown in detail in FIG. 2, the piston 5 fixed to the piston rod 3 slides in each of the cylinder assemblies in a replaceable cylinder liner 6 resting at one end on a plane support face 7 of the pump body, and a gasket 8 could be placed between these two parts. The cylinder 6 is centered and guided by a carrier ring 9 fixed together with the pump body 4 by means of screws 10 to a front part 1a of the pump casing 1.

The cylinder liner 6 is surrounded by a hydraulically operated clamping device denoted here by the number 11 and comprising an annular piston 12 and annular cylinder 13. The latter can be screwed in the carrier ring 9 by means of a screw thread 14 on both parts, and in its screwed-in position it can be secured by means of a screw 15. The numbers 16 and 17 denote gaskets on the annular cylinder 13 and annular piston 12.

The annular piston 12 has an extension 12a extending in the drawing at the left hand end of the cylinder liner 6, that is to say, the free end of the cylinder liner. The extension 12a has a male screw thread so that a shrouded nut 18 can be screwed on it, the nut resting against the end of cylinder liner 6.

The annular cylinder 13 has a part 13a with female thread, projecting from the carrier ring 9, and a holding ring 19 equipped with a suitable male thread can be screwed into it, this ring being capable of resting with its front end against a raised part or shoulder 12b of the annular piston 12.

In the annular cylinder 13 there is a pressure medium pipe 20. By means of this pipe, pressure medium such as oil can be admitted to the cylinder in order to act on the annular piston 12. This is done, for instance, by means of a hand pump not shown here. The hand pump can be placed on a nipple 22 on the cylinder 13, after a dust cap 21 has been taken off.

A cylinder liner is inserted and clamped as follows. When the shrouded nut 18 has been taken off, the liner 6 is pushed into the carrier ring 9 as far as it will go. The shrouded nut 18 is then screwed on the extension 12a of the annular piston 12 until it comes to rest on the end of the cylinder liner 6. Now pressure medium is admitted to the cylinder 13 through the pipe 20 so as to act on the annular piston 12 and thus clamp the cylinder line 6, the force being transmitted from the annular piston 12 through the shrouded nut 18 to the cylinder line 6. When the required clamping force has been reached, this force being indicated, for instance, on a pressure gauge, the holding ring 19 is screwed in further, the pressure being maintained, until the holding ring 19 comes to rest on the shoulder 12b of the annular piston 12. In this way the large axial force generated by hydraulic means is maintained by mechanical means. The hydraulic pressure can now be released.

In order to remove a cylinder liner, first pressure medium is admitted so that the holding ring can be unscrewed. After release of the hydraulic pressure and unscrewing the shrouded nut 18, the cylinder liner 6 can be removed.

The arrangement according to the invention enables the cylinder liner to be clamped properly and safely, with little expenditure of time and labour. In order to take out the cylinder liner, it is only necessary to unscrew the light shrouded nut, all other parts remaining in their places.

All features mentioned in the above specification or shown in the drawing can be regarded, individually, or in combination, as part of the invention, even if this is not specifically mentioned in the claims, provided that the known state of the art permits this.

What I claim is:

1. A piston pump for liquids, in particular a high-pressure pump, with means for clamping the cylinder liner or cylinder liners against a supporting face, wherein the cylinder liner is surrounded by a pressure medium actuated clamping device, comprising an annular cylinder connected to the fixed part of the pump, an annular piston accommodated in the annular cylinder, and a connection for transmitting forces between the annular piston and the cylinder liner and provided also with at least one mechanical means for maintaining the clamping force after the pressure medium has been released.

2. A piston pump according to claim 1 in which the annular piston has a sleeve-shaped extension with a thread at its free end for screwing on it a shrouded nut or the like so that it rests against the end of the cylinder liner.

3. A piston pump according to claim 1 in which the mechanical means comprise a holding ring for maintaining the clamping force supplied by the action of the pressure medium, the holding ring being capable of screwing on the annular cylinder of the clamping device and engaging with a shoulder or the like of the annular piston.

4. A piston pump according to claim 1 in which the annular cylinder is detachably connected to a carrier ring surrounding the cylinder liner and fixed to the pump casing.

5. A piston pump according to claim 4 in which the annular cylinder can be screwed to the carrier ring.

6. A piston pump as claimed in claim 2 in which the mechanical means comprise a holding ring for maintaining the clamping force supplied by the action of the pressure medium, the holding ring being capable of screwing on the annular cylinder of the clamping device and engaging with a shoulder or the like of the annular piston.

7. A piston pump according to claim 2 wherein the annular cylinder is detachably connected to a carrier ring surrounding the cylinder liner and fixed to the pump casing.

8. A piston pump as claimed in claim 7 wherein the annular cylinder can be screwed to the carrier ring.

9. A piston pump as claimed in claim 3 in which the annular cylinder is detachably connected to a carrier ring surrounding the cylinder liner and fixed to the pump casing.

10. A piston pump according to claim 9 in which the annular cylinder can be screwed to the carrier ring.

References Cited

UNITED STATES PATENTS

| | | | |
|---|---|---|---|
| 2,686,090 | 8/1954 | Leman | 92—171 |
| 2,921,436 | 1/1960 | Canner | 285—18 |
| 3,427,048 | 2/1969 | Brown | 285—18 |
| 3,477,744 | 11/1969 | Brown | 285—18 |

MARTIN P. SCHWADRON, Primary Examiner

R. H. LAZARUS, Assistant Examiner

U.S. Cl. X.R.

92—171; 285—18